United States Patent
Apel (10) Patent No.: US 6,498,481 B2
(45) Date of Patent: Dec. 24, 2002

(54) ANGEL-OF-ROTATION SENSOR DEVICE (75) Inventor: Peter Apel, Suedkirchen (DE)

(73) Assignee: AB Eletronik GmbH, Werne (DE)

( * ) Notice: Subject to any disclaimer, the term of this patent is extended or adjusted under 35 U.S.C. 154(b) by 0 days.

(21) Appl. No.: 09/854,377

(22) Filed: Jul. 16, 2001

(65) Prior Publication Data
US 2002/0047704 A1 Apr. 25, 2002

(30) Foreign Application Priority Data

May 13, 2000 (DE) .......................... 200 08 663
May 16, 2000 (JP) .......................... 100 23 695
Jan. 10, 2001 (DE) .......................... 101 16 459

(51) Int. Cl.⁷ .............................. G01B 7/14; G01B 7/30
(52) U.S. Cl. ................... 324/207.2; 73/118.2
(58) Field of Search ................. 324/207.2, 207.25, 324/207.12, 207.14, 207.21, 207.22; 73/118.2, 116, 118.1; 174/27

(56) References Cited

U.S. PATENT DOCUMENTS 4,994,739 A * 2/1991 Honda et al. .......... 324/207.14
5,309,053 A * 5/1994 Ade .......................... 310/71
5,672,818 A * 9/1997 Scharfer et al. ........... 73/118.2

FOREIGN PATENT DOCUMENTS

| EP | 1054237 | 11/2000 |
|----|---------|---------|
| WO | WO9514911 | 6/1995 |

* cited by examiner

Primary Examiner—Edward Lefkowitz
Assistant Examiner—Subhash Zaveri
(74) Attorney, Agent, or Firm—Milde & Hoffberg, LLP (57) ABSTRACT In order to simplify the installation of an angle-of-rotation sensor and to prevent destruction or function impairment caused by temperature variations, a stamped lead assembly (25) is at least partially embedded into a shaped holding bracket (24) forming a holder unit (23) which holds a stator unit (2), a sensor element (4, 5) and an output unit (26, 51). An expansion unit (30) is positioned on the lead lines of the stamped lead assembly (25) and at least partially positioned in the shaped holding bracket (24). The expansion unit (30) consists of lead lines exposed through a window of the shaped holding bracket (24). The window is limited by at least one shaped holder strip. At least one expansion notch is incorporated into the lead lines.

21 Claims, 6 Drawing Sheets

ANGEL-OF-ROTATION SENSOR DEVICE

BACKGROUND OF THE INVENTION

The present invention relates to an angle-of-rotation sensor that includes at least the following elements:

(1) a rotor unit positioned on shaft for rotation about an axis;

(2) a stator unit disposed on the rotational axis and having at least one sensor element which creates a signal that corresponds to the rotational position of the rotor unit with respect to the stator unit;

(3) a stamped lead assembly at least partially imbedded in insulating material comprising at least one lead line by means of which the signal is passed to an output unit; and (4) at least one circuit component connected to the lead assembly.

A device of this type is known from EP-A-1 054 237 which corresponds to DE-U-20 002 719, DE-U-20 003512 and U.S. patent application Ser. Nos. 09/702,342 and 09/788,630.

Two Hall sensors are arranged in a gap recess between stator elements of the stator unit. The rotor unit with a magnet is free to move within an air gap with respect to the stator unit. The stator and rotor units are at least partially surrounded by a housing body. The housing body includes a plug unit with plug contacts. The Hall sensors are connected to the plug contacts of the plug unit via a stamped lead assembly (lead frame). Components are mounted on the lead frame, which consists of several lead lines. When the housing body is formed, the lead frame and the components are at least partially incorporated into the housing parts consisting of plastic.

Installation of the individual parts of the angle-of-rotation sensor has turned out to be difficult. Also, the stamped lead assembly and the parts of the housing in which the lead assembly is embedded possess different coefficients of expansion. When such a device is installed in the engine compartment of an automobile, the Hall sensors may be displaced because of the prevailing temperatures of from minus 40° C. to 140° C., with results ranging from measurement inaccuracy and materials expansion problems to cracking of the stamped lead assembly and/or the housing body.

An angle-of-rotation sensor is also known from the International Patent Publication No. WO-A-9 514 911. It consists of a stationary part and a rotating part. The stationary part comprises two half-moon-shaped stator elements between which a gap is located. A Hall sensor is located in the gap. The rotating part includes a ring-shaped magnet that is held in place by a bracket and is free to move around the stator elements within the gap.

This angle-of-rotation sensor has proven itself, but its installation is relatively expensive.

SUMMARY OF THE INVENTION

The principal object of the invention is therefore to develop an angle-of-rotation sensor of the above-mentioned type to the extent that its installation is simplified, and that the temperature variations may be managed without device destruction.or function impairment.

This object is achieved by the invention wherein the stamped lead assembly is at least partially embedded in a shaped holding bracket by means of which, forming a holder unit, the stator unit is held together with the sensor element and the output unit, and wherein an expansion unit is positioned at least within the lead lines of the stamped lead assembly and at least partially in the shaped holding bracket.

The advantages realized by the invention result primarily from the fact that the expansion unit positioned in the bracket between the stator elements and the output unit allows compensation for the variations in expansion between the lead lines made of metal and the holding bracket made of plastic. A further advantage is the fact that the sensor element is already combined with the output unit and that the stator unit is combined with the sensor element and the output unit as an assembled piece by the holding unit. This allows reduction of installation costs during assembly of the position sensor device. Also, the main parts of the position sensor device are pre-adjusted, and require no further adjustment after installation.

At least one electronic component may be embedded into the shaped holding bracket. The stator unit may be held together by the shaped holding bracket with the sensor element and the output unit as described above.

The shaped holding bracket, as mentioned above, may be manufactured from insulating material. It is also possible to manufacture the shaped holding bracket of metal, whereby the stamped lead assembly is insulated by the insulation within the metal holding bracket.

Each sensor element may include at least one connection element that is connected with the lead lines of the stamped lead assembly. At least one additional component may be connected to at least one connection element. Production costs may be reduced by positioning components directly onto the connection elements of the sensor elements. The electronic components may be checked before installation by the sensor elements. If the components or the sensor element itself is defective, only one part of the position sensor device need be replaced.

At least one conductor expansion notch may be included in the connection element. The manner of installation of line conductor expansion notches depends, of course, on the design of the connection line elements. Additional components may be soldered to two adjacent connection line elements. This allows the use of inexpensive connection equipment.

The components and additional components may be arranged parallel or offset to one another on the lead lines and on the connection line elements. The electronic components and additional components may be separate or mounted on a printed circuit board. The manner of arrangement of components and/or printed circuit boards with one or more components depends on the particular requirements or possibilities.

The expansion unit may take various forms.

A first embodiment of an expansion unit includes an expansion arch arranged within the stamped lead assembly and a shaped holding bracket expansion arch in the shaped holding bracket compatible with it. An expansion arch used here, as known from tubing construction, is completely included into the holding bracket. This expansion arch may be semi-circular, U-shaped, Ω-shaped, or similar. Such an expansion arch compensates for all length alterations of the stamped leads and the shaped holding bracket of the holder unit surrounding it. It is distinguished by its simplicity and by a high resistance to external influences such as dirt and moisture.

A second embodiment of an expansion unit is shaped more suitably. For it, a lead window is included in the shaped holding bracket that exposes the individual leads in this area. The lead window may be limited by at least one shaped holding strap. The expansion notches in the leads accept material shrinkage or expansion. In the area of the expansion notches, the leads may deform laterally or upwards during material expansion. During shrinkage processes, on the other hand, the material of the leads is stretched in the area of the lead recesses. Plastic is more flexible than metal in elongation or compression. That is why the straight shaped holding strap of the grid window can accept slight elongations or separations.

So that the material alterations need not be compensated only by materials properties, the shaped holding bracket or the exposed lead lines may be more expansion-intensive. A shaped expansion arch may be used here. The shaped expansion arch easily compensates for all materials alterations that may result from the broad range of temperatures between minus 40° C. and 140° C. occurring in the engine compartment of an automobile.

For a third embodiment of an expansion unit, two expansion units of the second type are arranged one after the other.

The expansion arcs may be bent either upwards or downwards in the second and the third expansion unit with respect to the lead lines of the lead assembly that run straight through them.

A stepped expansion piece may be positioned between the first and the second lead window of the third expansion unit. This allows the third expansion unit to act, in part, as a fourth expansion unit.

The stator unit may comprise two stator elements that are arranged together by means of at least one separation recess. At least one Hall sensor may be arranged in one of the separation recesses as a sensor element. The rotor unit may consist of at least one magnet segment that is positioned on the shaft. The shaped holding bracket may be so positioned within a housing body so that it is perpendicular to the rotor axis, that the stator segments are arranged facing the magnet across an air gap, and so that the output unit is properly arranged within the housing. Thus, the position sensor device is installed using only a few hand motions. The entire installation is thus reduced to a few hand motions because the main parts are already properly installed and positioned. The output unit may consist of a plug unit and a drive unit. The plug unit may be properly positioned within a plug recess in the housing body. The drive unit may be properly installed by placing it in a drive housing of the housing body.

The connection line elements may be at least partially bent along a curved line. Two Hall sensors are provided. These Hall sensors are bent at about a 90° angle from the curved line so that they may be positioned properly and accurately in the gap recesses between the two stator elements. The various embodiment options of the expansion unit ensure that the two Hall-sensors always remain in the proper position in the gap recesses. Thus, accurate measurement value determination of the rotation of the rotor unit with respect to the stator unit is possible.

For a full understanding of the present invention, reference should now be made to the following detailed description of the preferred embodiments of the invention as illustrated in the accompanying drawings.

DESCRIPTION OF THE PREFERRED EMBODIMENT

The preferred embodiments of the present invention will now be described with reference to FIGS. 1–15 of the drawings. Identical elements in the various figures are designated with the same reference numerals.

As FIGS. 1 to 5 show, the angle-of-rotation sensor according to the invention includes a rotor unit 1 and a stator unit 2. The stator unit 2 in FIGS. 2 and 3 consists of two opposing stator segments 21 and 22. Both stator segments are shaped like end-cutting pliers. The difference is that they do not have any sharp edges.

There has thus been shown and described a novel angle-of-rotation sensor device which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

Figure 2:
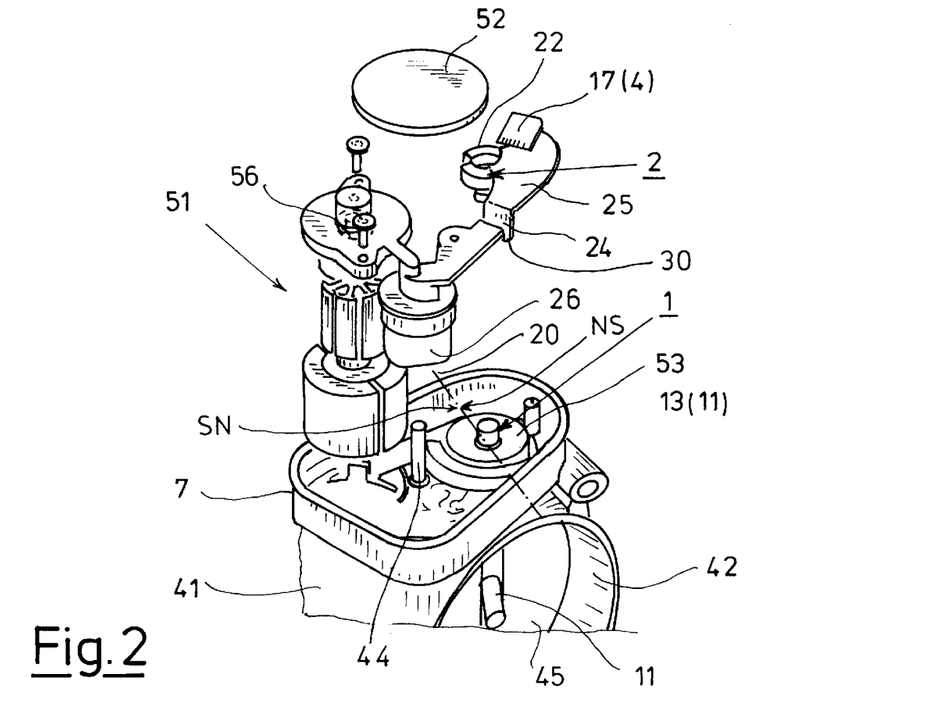
FIG. 2 shows an angle-of-rotation sensor of FIG. 1 in a disassembled schematic perspective partial top view.
Figure 3:
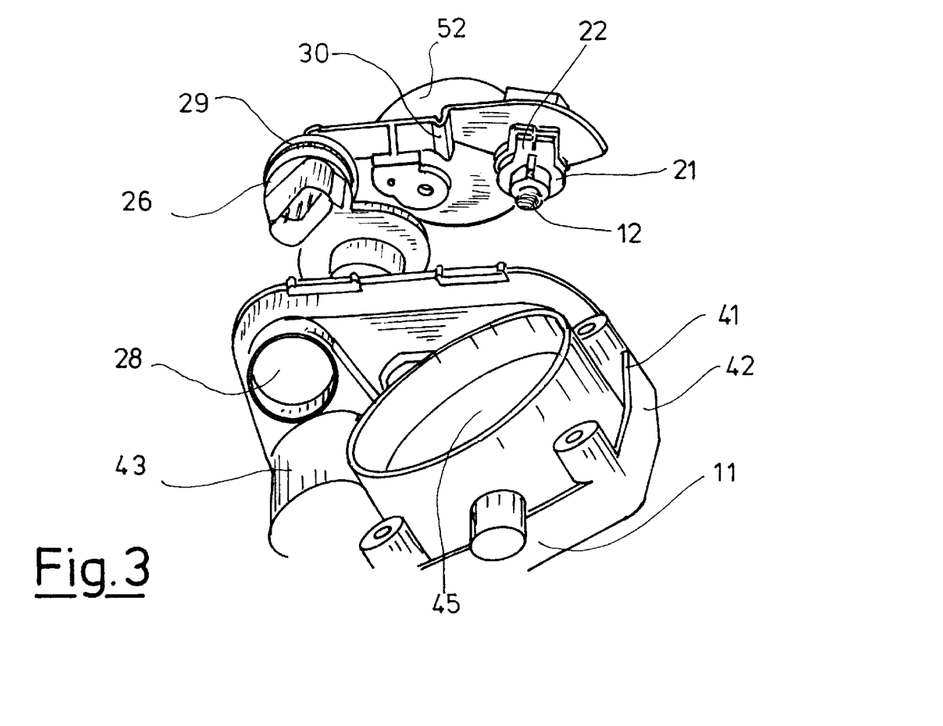
FIG. 3 shows an angle-of-rotation sensor of FIG. 1 in a disassembled schematic perspective partial side view.

Two gap recesses 9.1, 9.2 are located between both stator segments 21, 22, whereby one or two Hall sensors 4, 5 is positioned in the wider gap recess 9.1. The Hall sensors may be in the form of Hall elements or Hall IC circuits.

Figure 4:
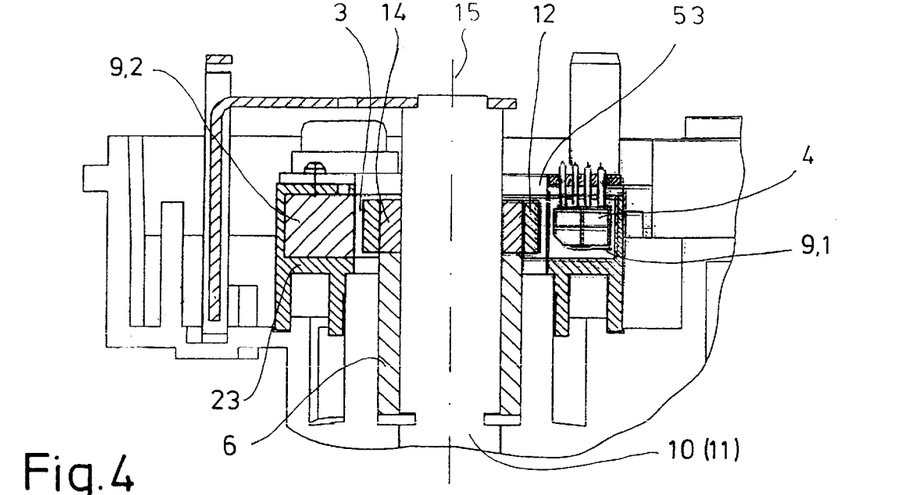
FIG. 4 is a cutaway schematic view through an angle-of-rotation sensor of FIG. 1.

Stator segments 21, 22 with the applied Hall sensors 4, 5 are held in place by a holder 23 that is positioned at right angles to a rotation axis 15 (see FIG. 4). The holder 23 includes a shaped holding bracket 24 in which the stamped lead assembly 25 is embedded. A circuit board, connected with the leads is in the form of an integrated circuit (IC) 17. The circuit 17 includes electronic components and/or the Hall sensors 4, 5.

The two Hall sensors 4, 5 may also be connected directly with the stamped lead assembly 25.

Figure 5:
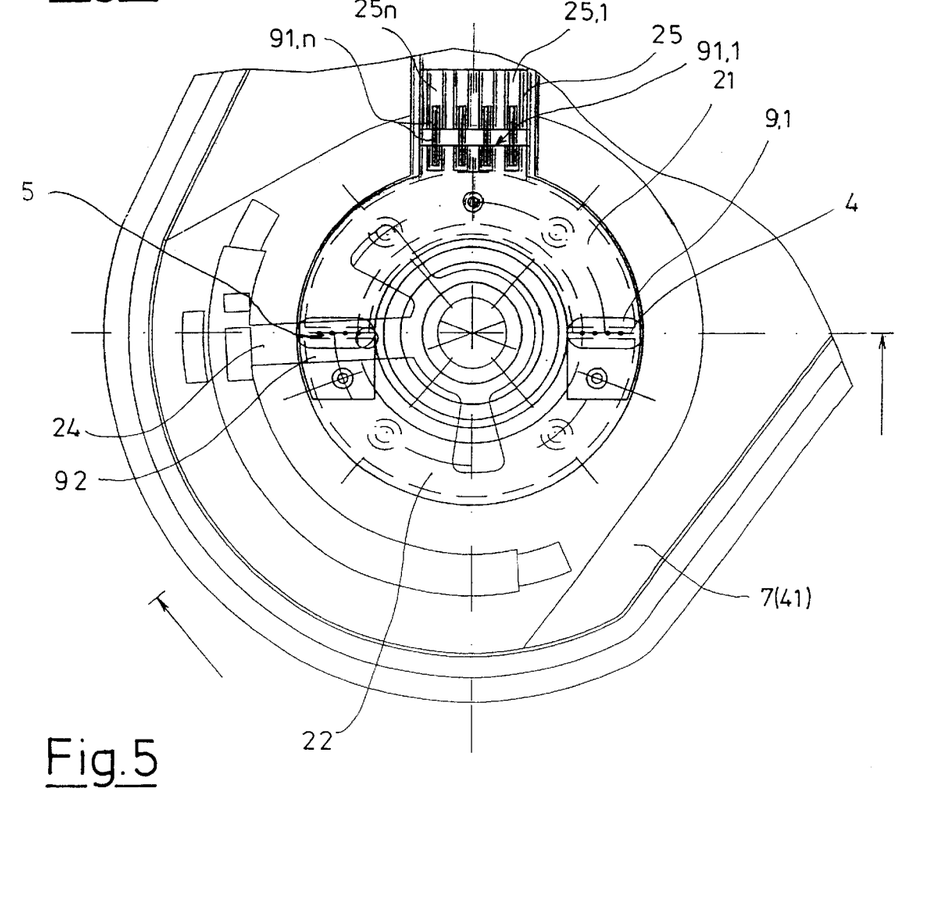
FIG. 5 is a top schematic view of an angle-of-rotation sensor of FIG. 1 with components arranged on a stamped lead assembly.

The stamped lead assembly 25 consists of adjacent lead lines 25.1, ..., 25.n (see FIG. 5). Components 9.1.1, ..., 91.n are arranged on the lead lines. At the other end, essentially across from the stator segments 21, 22, a plug unit 26 and a drive unit 51 are positioned on the stator holder unit 25. As FIGS. 2 and 3 show, the stamped lead assembly connects the IC 17 with the two Hall sensors 4, 5, or the Hall sensors 4, 5 alone and the plug unit 26 and the drive 51 (see FIG. 1).

As FIG. 3 particularly shows, the plug unit 26 includes a sprayed or installed gasket unit 29. A soft plastic may be used for a sprayed gasket element 29. The gasket element ensures that the plug unit is protected from moisture and dust with respect to the other parts of the device.

The drive unit 51 includes an electric motor with carbon brushes and a motor shell. An integrated bushing bearing 56 is positioned in the area of the motor shaft (see FIG. 2). The carbon brushes are properly positioned by the holder unit 23 in the carbon brush holders 54, 55. The two carbon brushes are each connected with a lead line to the plug unit 26 (see FIG. 1).

As shown in FIG. 2, the rotor 1 includes a ring magnet 13 that includes a north-south polarization N S on one side of the axis and south-north polarization S N on the opposing side. This results in two opposing magnet segments. The particular polarization of the two magnet segments ensures that the magnetic flux has a straight path.

As FIG. 4 particularly shows, the shaft 10 that extends out from the housing body 7 is surrounded by a shaft holding element 6.

A magnet holder 14 is positioned on the shaft 10 that holds a ring magnet element 13 or a magnet segment. The magnet holder 14 consists of magnetically conducting material, whereby the shaft consists of a non-magnetically conducting material.

The housing body 7 is positioned on a throttle valve housing 41. A recess 28 for the plug 26 is included in the bottom of the housing body. On the floor of the housing body 7 is positioned a motor drive housing 43.

A pin 44, extending out of the housing body 7, supports a cover (not shown) by means of which the housing body 7 may be sealed.

The throttle valve housing 44 has a throttle valve recess 42 positioned essentially perpendicular to the housing body, in which a throttle valve (butterfly valve) 45 is positioned, free to rotate on a throttle valve shaft 11. The throttle valve shaft 11 becomes the shaft 10, as FIG. 4 particularly shows.

The drive unit 51 is connected with the throttle valve shaft 11 via a gear train, of which at least gears 52, 53 are visible. The gear 53 is already mounted on the shaft 10, while the gear 52 is later placed on a pin and engaged with the gear of the drive unit 51.

According to the present invention:

The stator unit 1 with the holder unit 23 and with the separated stator segments 21, 22 and previously-installed Hall sensors 4, 5, the plug unit 26, the stamped lead assembly 25, and the shaped holding bracket 24 surrounding them, the drive unit 51 with the motor unit and necessary carbon brushes or motor shaft and a part of the gear train are held in place by the installation, and The rotor unit is positioned by the installation, with the ring magnet 13 or the magnet segment and the gear 53 as a part of the gear train, on the throttle valve 11.

Figure 1:
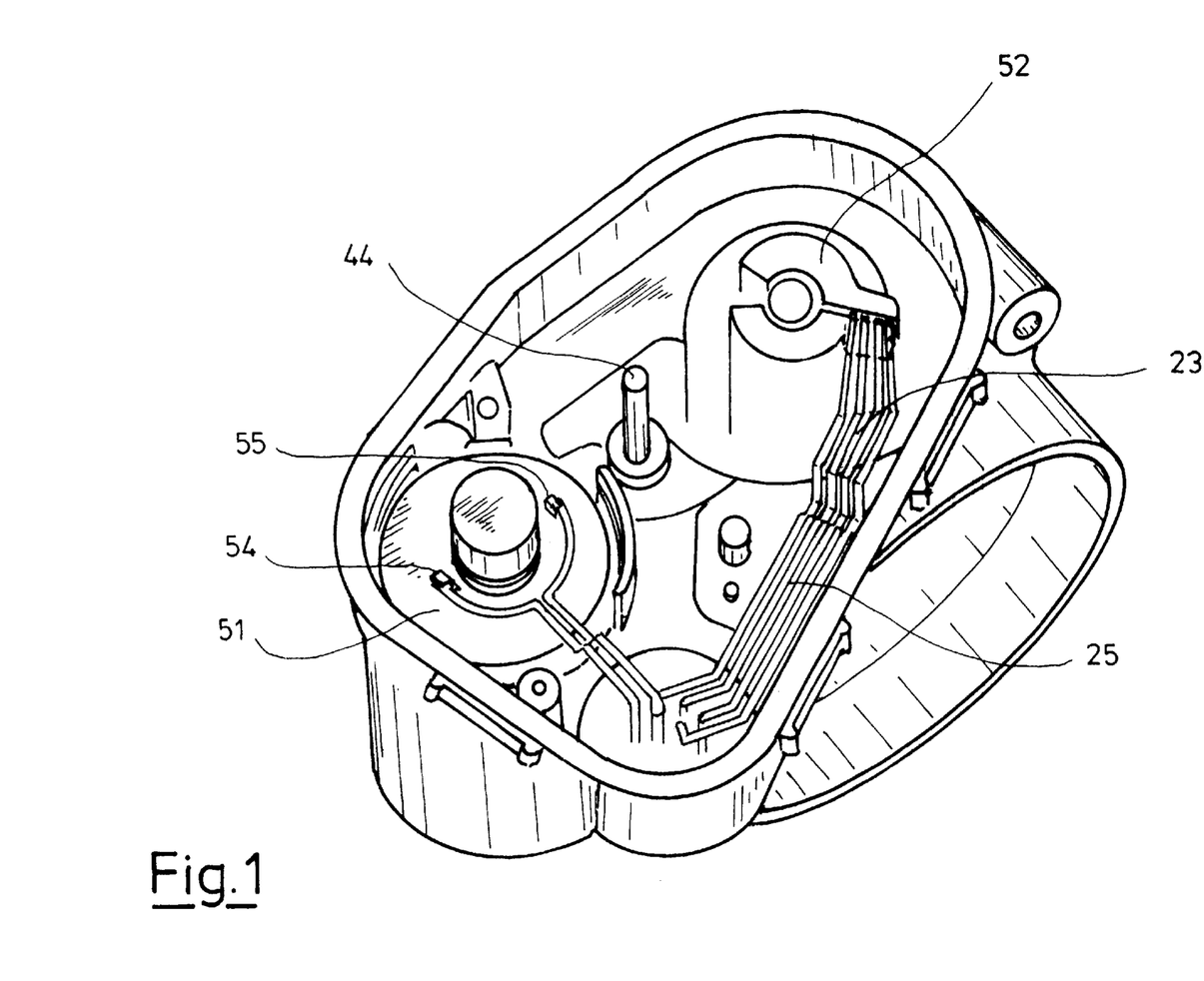
FIG. 1 shows an angle-of-rotation sensor with a holder unit in which an expansion unit is positioned in installed condition in a schematic perspective partial view according to the invention installed in the throttle assembly of an automobile engine.

Also according to the invention:

An expansion unit 30 is positioned in the holder unit 23, as shown in FIGS. 1 to 3.

Figure 6:
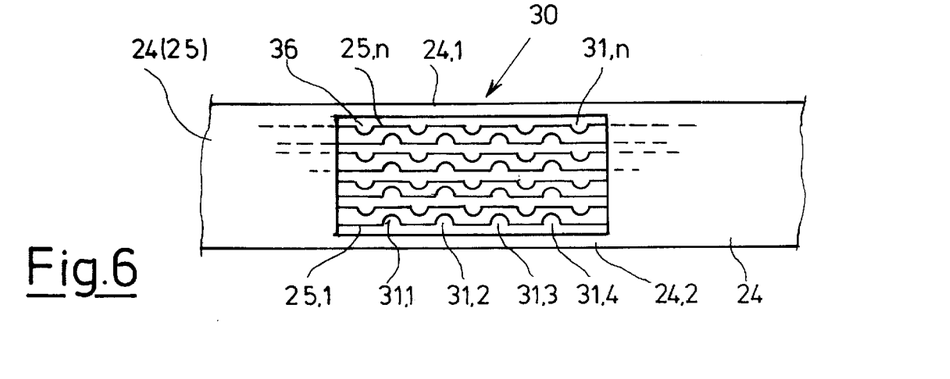
FIG. 6 is a top schematic view of an expansion unit in the angle-of-rotation sensor of FIGS. 1 to 3.

The expansion unit 30 is also shown in FIG. 6.

A lead window 36 is placed into the shaped holding bracket 24 made of plastic that surrounds the stamped lead assembly 25. This exposes the individual leads 25.1, ..., 25.n. The lead window is limited by two opposing shaped strip holder brackets.

As may be seen on the lead 25.1 (FIG. 6), expansion notches 31.1, 31.2, 31.3, and 31.4 are provided, separated from one another on the one side. Offset to them on the opposing flat side of the lead lines 25.1 are similar expansion notches. The expansion notches 31.1, ..., 31.4 are semicircular-shaped. Similar expansion notches ... 31.n are included in the other lead lines ... 25.n that may also be of a different geometrical shape.

The ambient temperature in an automobile engine compartment may range from minus 40° C. to plus 140° C. In such case, the length changes caused by temperature variations are compensated by the expansion notches 31.1, ..., 31.n in the lead lines ... 25.1, ..., 25.n. Should the metal of which the lead lines are made contract at low temperatures, these may be stretched because of material weaknesses that arise from the expansion notches. If the lead line metal is heated, the additional length is also compensated by the expansion notches. The straight shaped holder strips 24.1, 24.2 may also compensate to some extent for length reductions or extensions because of the elasticity of the plastic used.

Figure 7:
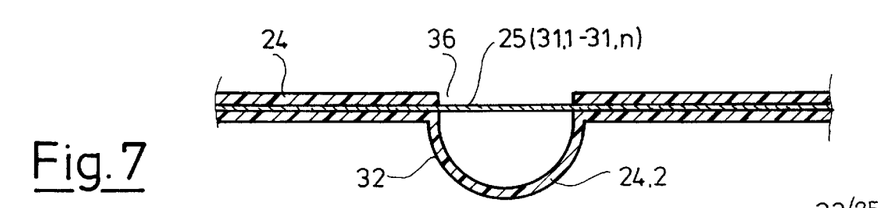
FIG. 7 is a first embodiment of an expansion unit as in FIG. 6 in a cutaway schematic view.

Compensation by the plastic shaped holder strips 24.1, 24.2 is improved by the fact that they are formed as a shaped expansion arch 32, as FIG. 7 shows. This ensures that the plastic shaped holder strips cannot tear or break. It is also possible for the plastic shaped holder strips 24.1, 24.2 to pass straight through and for the lead lines be bent either with or without the use of expansion notches into a shaped expansion arch.

Figure 8:
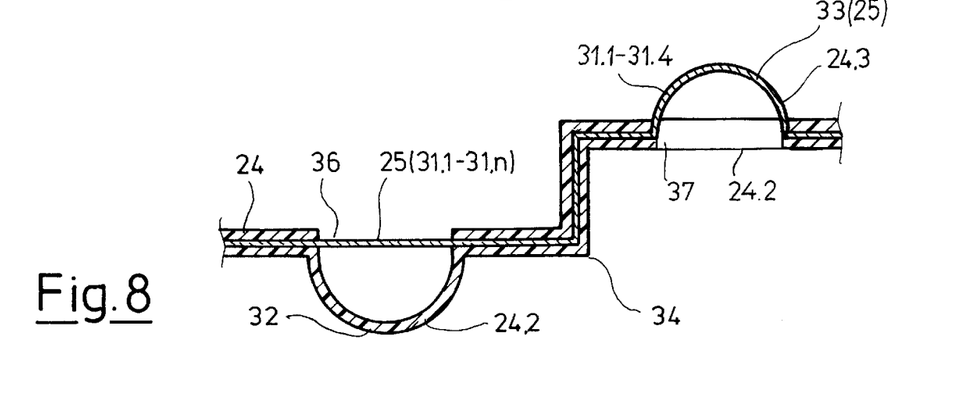
FIG. 8 is a second embodiment of an expansion unit as in FIG. 6 in a cutaway schematic view.

FIG. 8 shows two expansion configurations similar to FIGS. 6 and 7 but arranged one after the other.

In this case, the lead lines with expansion notches pass through the shaped holder strips 24.1, 24.2 bent as a shaped expansion arch 32. The shaped expansion arch 32 is also bent toward the bottom with respect to the lead lines passing straight through as in FIG. 7.

A second shaped expansion arch 33 lies behind the shaped expansion arch 32 in which the lead lines 25.1, ..., 25.n, which may also be provided with additional expansion notches, are bent toward the top with respect to the shaped holder strips 24.3 passing straight through. As a result, the arrangement of the two shaped expansion arches 32, 33 one behind the other with lead lines provided with expansion notches allows compensation for extreme length alterations.

Compensation potential may also be improved by positioning a stepped shaped expansion arch 34 between the two shaped expansion arches. The shaped expansion arch 32 represents a double bend of the shaped holding bracket 24. When temperature variations cause materials contraction or expansion, the arising expansion or contraction forces are first assumed by the stepped shaped expansion arch 34, and then by the shaped expansion arches 32, 33 positioned before and after it with the lead lines passing straight through them in which expansion notches are included.

Figure 9:
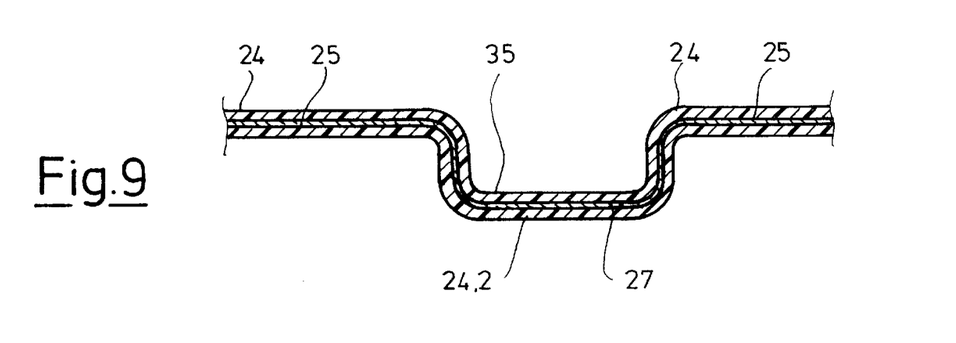
FIG. 9 is a third embodiment of an expansion unit as in FIG. 6 in a cutaway schematic view.

FIG. 9 shows the expansion unit 30 as a shaped holding bracket expansion arch 35. The shaped holding bracket expansion arch 35 is installed into the complete holder unit 23 without exposure of the lead lines. For this, the shaped holding bracket 24 and the stamped lead assembly 25 surrounded by it are correspondingly shaped by bending. The shaped holding bracket expansion arch 25 is not produced by bending an existing straight holding unit, but rather, the shaped holding bracket 24 is correspondingly shaped around the bent lead lines.

As FIG. 9 shows, the shaped holding bracket expansion arch 35 is U-shaped. It may also be C-shaped, Ω-shaped, or V-shaped. All of these configurations compensate for length differences during temperature variations. By transferring the principle of the expansion arch known for tubing, a reliable expansion loop is achieved. Special sliding bearings as known from use with tubing are not required here, since the length differences are not so great.

Figure 10:
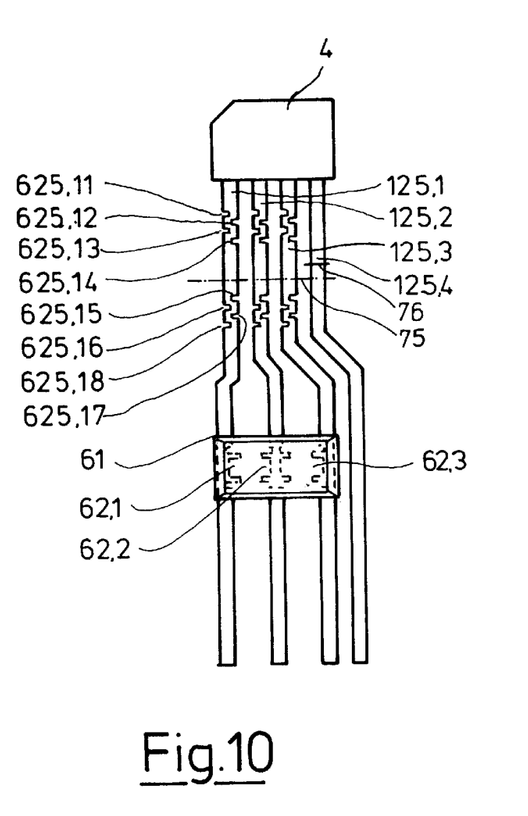
FIG. 10 is a top schematic view of a Hall sensor with connecting lead lines for an angle-of-rotation sensor, as in FIGS. 1 through 5, with pertinent electronic components.
Figure 11:
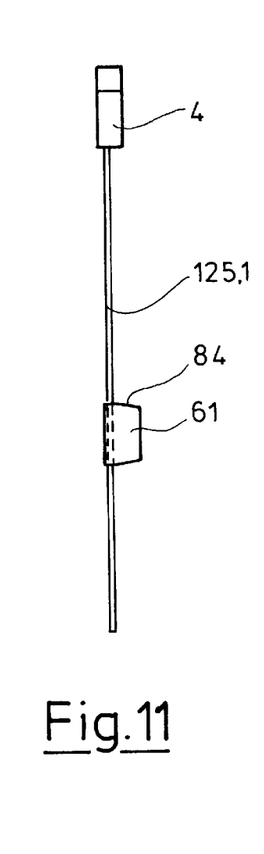
FIG. 11 is a side schematic view of a Hall sensor as in FIG. 10.

FIGS. 10 and 11 show a Hall sensor 4. A total of four connection line elements 125.1, 125.2, 125.3, and 125.4 extend into the Hall sensor 4.

So that the Hall sensor 4 is not displaced from the front by expansion forces, line expansion notches 625.11, . . . , 625.18 are provided in the connection line elements. The line expansion notches are similarly formed and have the same function as the expansion notches in the lead lines of the stamped lead assembly 25.

For the sake of illustration clarity, the line expansion notches may also be implemented as expansion notches 31.1, . . . , 31.n that are included in the lead lines.

Of the four connection line elements 125.1, . . . , 125.4, the first three are connected to lead lines 25.1, 25.2, and 25.3. Thus, connection line element 125.1 conducts the output signal issued by the Hall IC unit; the second connection line element is connected to plus, and the third connection line element 125.3 is connected to minus. The fourth connection line element 125.4 remains available for testing purposes.

A component holder frame 61 is provided between the three connection line elements 125.1, 125.2, and 125.3. The component holder frame 61, which need not be included, contains component shaped holding brackets 62.1, 62.2, and 62.3. The three shaped holding brackets are opposing. This makes it possible to arrange components 84 etc. adjacently.

Figure 12:
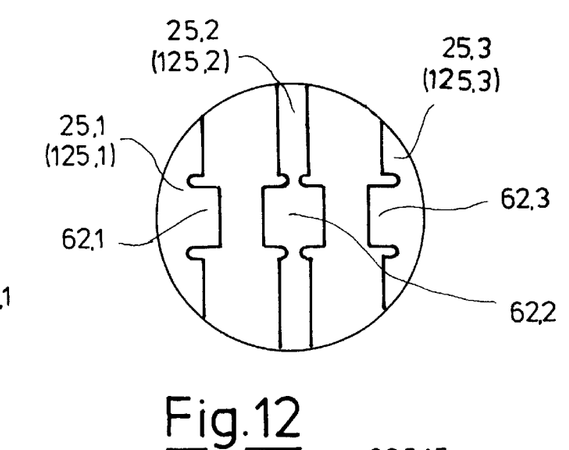
FIG. 12 is a partial top schematic view of a component holder bracket for a stamped lead assembly as in FIG. 5 and connecting lines as in FIG. 10.

FIG. 12 shows with a cutaway view how the connection line elements or the lead lines are prepared for acceptance of the components. The component shaped holding brackets 62.1, 62.2, and 62.3 are formed as widened parts of each rail. Thus, a component may be positioned between the first and second rails, and a second component may be positioned between the second and third rails.

Figure 13:
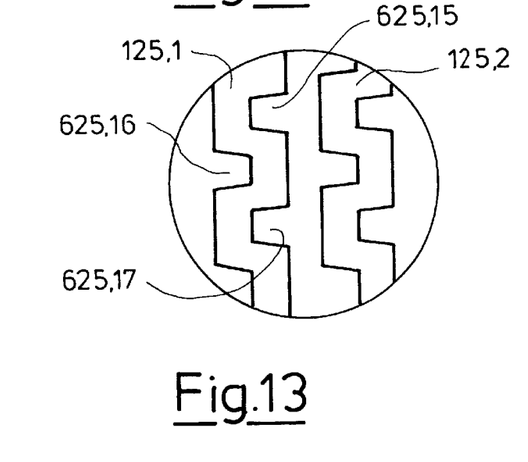
FIG. 13 is a partial top schematic view of line expansion notches for connecting lines as in FIG. 10.

FIG. 13 shows a section of the line expansion notches 625.11, . . . The line expansion notches are thus so positioned that the connection line elements have essentially a wave-like shape in this area. This makes it possible to compensate for length alterations quickly and reliably.

Figure 14:
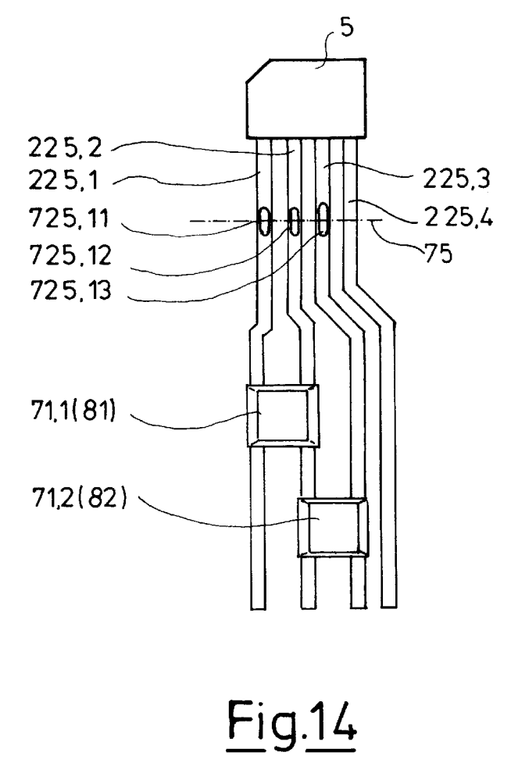
FIG. 14 is a top schematic view of another Hall sensor with connecting lines and pertinent electronic components.

FIG. 14 shows the Hall sensor 5 that includes four connection line elements 225.1, 225.2, 225.3, and 225.4. The connection line elements are connected accordingly. In contrast to the connection line elements 125.1, . . . , longitudinal recesses 725.11, 725.12, and 725.13 are included in the connection line elements 225.1, . . . as line recesses.

A component holder frame 71.1 is located between the connection line elements 225.1 and 225.2. Under and adjacent to it and between the connection line elements 225.2 and 225.3 is positioned a component holder frame 71.2. One electronic component is to be placed into each of the frames 71.1 and 71.2.

Figure 15:
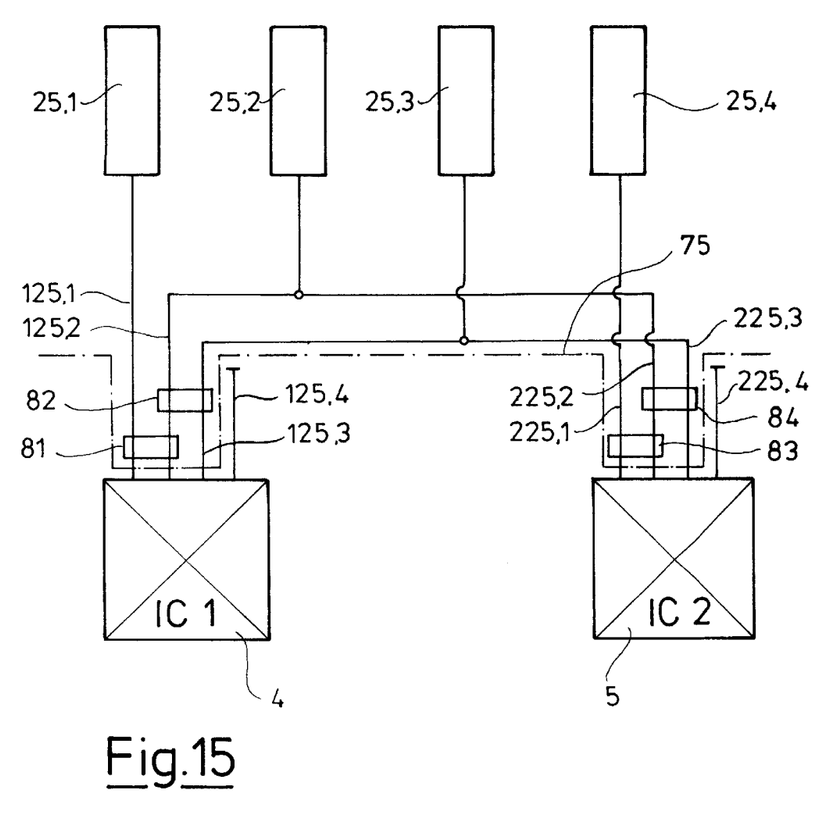
FIG. 15 is a schematic partial view of an electronic circuit with connecting lines forming a lead assembly.

FIG. 15 shows the connection circuit of the two Hall sensors 4 and 5 and their connection line elements to the lead lines of the stamped lead assembly. Here, the output signal of the IC 1 of the Hall sensor 4 passes to the lead line 25.1. The output signal of the IC 2 of the Hall sensor 5 is passed to the lead line 25.4. This is why the connection line element 125.1 is connected with the lead line 25.1, and the connection line element 225.1 is connected with the lead line 25.4. The next two connection line elements are then connected to the lead lines 25.2 and 25.3. Each of the fourth connection line elements 125.4 and 225.4 are kept free and used for testing purposes, as explained above.

It is significant that the connection line elements 125.1, 125.2, and 125.3, and the connection line elements 225.1, 225.2, and 225.3 are connected at an angle to an angled line 75 (see FIGS. 10, 14, 15). The fourth connection line, elements 125.4 and 225.4, is cut at a separation mark 76 before the angled line 75. Thus, the IC 1 and IC 2 are at a certain angle with respect to the straight lead lines 25.1, . . . , 25.4 of the stamped lead assembly 25. The angle is generally 90°. This ensures that the two Hall sensors 4 (IC 1) and 5 (IC 2) are positioned properly and accurately in the gap recess 9.2, and that they are held there.

When the angle-of-rotation sensor as described in FIGS. 1 through 15 is installed, the ring magnet element 13 or the magnet segment and then the holder unit 23 is placed onto the throttle plate shaft 11 which extends into the housing body 7. Guides for installation ensure and simplify the positioning of the holder unit 23 so that the separated stator segments 21, 22 are positioned to leave an air gap 3 with respect to the ring magnet element 13, and the plug unit is placed into the plug recess 28, and the drive unit 51 into the drive housing 43. The Hall sensors 4, 5 positioned on the IC circuit or connected individually with the leads are positioned and adjusted within the gap recess 9.2, and are already connected to the plug unit. The motor unit of the drive unit is then installed with properly-adjusted carbon brushes and properly-adjusted motor shaft.

The final step is to place the gear 52 onto the pin 44 completing the drive unit. A cap that can be supported by the pin 44 and that encloses the housing body 7 is now placed onto the housing body 7 with the angle-of-rotation sensor installed, as FIG. 1 shows.

The integrated bushing bearing 56 ensures free movement of the drive unit motor shaft. The gasket element 29 seals the plug unit 26 as it is inserted into the plug recess 28, so that moisture penetration into the interior of the housing body 7 sealed by the cap is prevented.

If an angle-of-rotation sensor configured as described is exposed to temperatures between minus 40° C. and plus 140° C., the expansion notches 31.1, . . . in the lead lines 25.1, . . . , and the line expansion notches 625.11, . . . in the connection line elements 125.1, . . . can accommodate the corresponding contraction or expansion of the material. Since a large number of notches is provided, the length expansion or contraction is distributed accordingly. Further, the line expansion notches in the connection line elements prevent the two Hall sensors 4, 5 from being influenced by temperature variations in the gap recess 9.2, or the punched grid unit from being displaced upward.

The correspondingly formed shaped expansion arcs 32, 33 ensure that the plastic holding bracket 24 cannot be displaced. Moreover, the length contractions or length alterations of the holding bracket 24 are compensated by the shaped expansion arcs. This ensures that the holder unit 23, consisting of the stamped lead assembly 25 and the holding bracket 24 formed around it, is not forced out of its installed position.

The installation of components 91.1, ..., 91.n using the corresponding component support brackets 61.1, ... as guides enables proper and precise positioning and attachment between the lead lines 25.1, ..., 25.n. For this, the components 91.1, ... may be positioned adjacent to one another, as FIG. 5 shows. This provides the opportunity of positioning the shaped holding bracket 24 above the components 91.1, ..., 91.n. This protects them effectively from external influences.

The mounting of additional components 81, 82, 83, and 84 onto the connection line elements 125.1, ..., 225.1, ... ensures effectiveness of the signal flow in the individual connection line elements. The components 81.1, ... soldered to the connection line elements are inexpensively attached to them. It is also possible to integrate the components 81, ..., 84 into the shaped holding bracket 24. For this, the shaped holding bracket may be bent and formed accordingly, and then reformed and routed further.

What is claimed is:

1. Angle-of-rotation sensor comprising at least:
   a rotor unit that is positioned on a rotational axis on a shaft element,
   a stator unit disposed on the rotational axis and having at least one sensor element which creates a signal that corresponds to the rotational position of the rotor unit with respect to the stator unit,
   a stamped lead assembly at least partially embedded in insulating material comprising at least one lead line by means of which the signal may be passed to an output unit, and
   at least one circuit component connected to the lead assembly,
   the improvement wherein
      the stamped lead assembly is at least partially embedded in a shaped holding bracket by means of which, forming a holder unit, the stator unit is held together with the sensor element and the output unit, and
   wherein an expansion unit is positioned at least within the lead lines of the stamped lead assembly and at least partially in the shaped holding bracket.

2. Angle-of-rotation sensor comprising at least:
   a rotor unit that is positioned on a rotational axis on a shaft element,
   a stator unit disposed on the rotational axis and having at least one sensor element which creates a signal that corresponds to the rotational position of the rotor unit with respect to the stator unit,
   a stamped lead assembly at least partially embedded in insulating material comprising at least one lead line by means of which the signal may be passed to an output unit, and
   at least one circuit component connected to the lead assembly,
   the improvement wherein
      the stamped lead assembly and at least one circuit component is at least partially embedded in a shaped holding bracket by means of which, forming a holder unit, the stator unit is held together with the sensor element and the output unit, and
   wherein an expansion unit is positioned at least within the lead lines of the stamped lead assembly and at least partially in the shaped holding bracket.

3. Angle-of-rotation sensor as in claim 1, wherein
   at least one component is embedded in a shaped holding bracket, and that the stator unit with the sensor element and the output unit and that the at least partially formed stamped lead assembly are held together by the shaped holding bracket as a holder unit.

4. Device as in claim 3, wherein the shaped holding bracket is made of a material selected from the group consisting of insulating material and a metal.

5. Device as in claim 1, wherein
   the sensor element includes at least one connection line element that is connected with the lead lines of the stamped lead assembly, and
   wherein at least one additional circuit component is mounted on at least one connection line element.

6. Device as in claim 1, wherein at least one expansion notch is included in the connection line elements.

7. Device as in claim 1, wherein the additional circuit components are soldered to two opposing connection line elements.

8. Device as in claim 1, wherein the components and the additional circuit components are arranged individually or on circuit boards parallel or offset to one another on the lead lines and on the connection line elements.

9. Device as in claim 1, wherein a first expansion unit consists of an expansion arch positioned within the stamped lead assembly, and a compatible shaped holding bracket expansion arch positioned within the shaped holding bracket.

10. Device as in claim 1, wherein
    a second expansion unit consists of lead lines exposed through a lead window of the shaped holding bracket, whereby the lead window is limited by at least one shaped holder strip, and
    wherein at least one expansion notch is included in at least one of the lead lines.

11. Device as in claim 1, wherein at least one of the shaped holder strip and the exposed lead lines are formed from a shaped expansion arch.

12. Device as in claim 1, wherein a third expansion unit comprises
    a first lead line exposed through a first lead window of the shaped holding bracket that is limited by at least a first shaped holding bracket, and
    a second lead line exposed through a second lead window of the shaped holding bracket that is limited by at least a second shaped holding bracket
    whereby the exposed first lead lines or the first shaped holding bracket are formed as a first shaped expansion arch, and
    whereby the exposed second lead lines or the second shaped holding bracket are formed as a second shaped expansion arch.

13. Device as in claim 1, wherein
    at least a first expansion notch is included in the first lead lines of the first lead window, and
    at least a second expansion notch is included in the second lead lines of the second lead window.

14. Device as in claim 1, wherein at least one of the shaped expansion arches is arched upward or downward with respect to the straight lead lines passing through the respective lead window.

15. Device as in claim 1, wherein at least one of the shaped expansion arches is arched upward or downward with respect to the straight shaped holding brackets.

16. Device as in claim 1, wherein at least one of the shaped expansion arches is arched upward or downward with respect to the straight lead lines passing through the respective lead window.

17. Device as in claim 1, wherein a stepped shaped expansion arch is positioned in the holder unit between the first and the second lead windows.

18. Device as in claim 1, wherein the stator unit comprises at least two stator segments that are arranged together leaving at least one separation recess, whereby at least one Hall sensor is placed into at least one of the separation recesses as a sensor element, wherein the rotor unit consists of at least one magnet element that is affixed to the shaft element, and wherein the holder unit is placed into a housing body at a right angle to the rotational axis so that the stator segments are arranged properly with respect to the magnet segment leaving an air gap, and the output unit is accordingly positioned.

19. Device as in claim 1, wherein the output unit consists of a plug unit and a drive unit, and wherein the plug unit is positioned in a plug recess, and the drive unit is placed into a drive housing of the housing body as a motor unit with its carbon brushes positioned therein.

20. Device as in claim 1, wherein the connection elements are partially bent along a bend line.

21. Device as in claim 1, wherein the magnet element is formed of at least one magnet segment or as a ring magnet.

* * * * *